(12) United States Patent
Takaochi et al.

(10) Patent No.: US 11,003,519 B2
(45) Date of Patent: May 11, 2021

(54) INFORMATION PROCESSING SYSTEM, CLUSTER SYSTEM CONSTRUCTION METHOD, AND NON-TRANSITORY COMPUTER-READABLE STORAGE MEDIUM FOR STORING CLUSTER CONSTRUCTION PROGRAM

(71) Applicant: FUJITSU LIMITED, Kawasaki (JP)

(72) Inventors: Kaname Takaochi, Hachioji (JP); Hiroyuki Inada, Kawasaki (JP); Asuka Okagawa, Kawasaki (JP); Masahiko Hasegawa, Kawasaki (JP); Koji Sugai, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 48 days.

(21) Appl. No.: 16/151,633

(22) Filed: Oct. 4, 2018

(65) Prior Publication Data
US 2019/0108083 A1 Apr. 11, 2019

(30) Foreign Application Priority Data
Oct. 10, 2017 (JP) .............................. JP2017-197101

(51) Int. Cl.
*G06F 11/07* (2006.01)
*G06F 11/14* (2006.01)
(Continued)

(52) U.S. Cl.
CPC .......... *G06F 11/0709* (2013.01); *G06F 9/445* (2013.01); *G06F 9/45558* (2013.01);
(Continued)

(58) Field of Classification Search
CPC .... G06F 11/0709; G06F 9/5077; G06F 9/445; G06F 9/45558; G06F 11/1484; G06F 11/2038; G06F 9/5061
See application file for complete search history.

(56) References Cited

U.S. PATENT DOCUMENTS 8,145,789 B1 * 3/2012 Stamler ............... H04L 41/0886
709/244
8,984,101 B1 * 3/2015 Viswanath .......... H04L 67/2842
709/220
(Continued)

FOREIGN PATENT DOCUMENTS

| JP | 2012-173751 | 9/2012 |
|---|---|---|
| JP | 2016-122421 | 7/2016 |
| WO | 2009/081736 | 7/2009 |

*Primary Examiner* — Jimmy H Tran
(74) *Attorney, Agent, or Firm* — Fujitsu Patent Center

(57) ABSTRACT

An information processing system includes a management apparatus that manages construction of a cluster system including a plurality of information processing apparatuses, the management apparatus being configured to acquire information relating to a configuration of the cluster system, and generate definition information that defines the configuration of the cluster system on the basis of the acquired information, and the plurality of information processing apparatuses each including a memory configured to store templates and association information, each of the templates being a model of a construction program to be used for construction of the cluster system, each of the templates including information that designates an extraction method of information from the definition information, and a processor configured to acquire the definition information, perform generation of the construction program in accordance with the definition information, the plurality of templates, and the association information, and execute the generated construction program.

11 Claims, 13 Drawing Sheets

(51) Int. Cl.
 *G06F 9/455* (2018.01)
 *G06F 9/445* (2018.01)
 *G06F 9/50* (2006.01)
 *G06F 11/20* (2006.01)
(52) U.S. Cl.
 CPC ........ *G06F 9/5077* (2013.01); *G06F 11/1484* (2013.01); *G06F 11/2038* (2013.01)

(56) References Cited

U.S. PATENT DOCUMENTS

| | | | |
|---|---|---|---|
| 10,298,670 B2* | 5/2019 | Ben-Shaul | H04L 67/1097 |
| 2005/0289388 A1* | 12/2005 | Black-Ziegelbein | H04L 41/0893 714/6.32 |
| 2006/0026267 A1* | 2/2006 | Godin | H04L 41/0213 709/220 |
| 2007/0156789 A1* | 7/2007 | Semerdzhiev | G06F 16/1787 |
| 2007/0156904 A1* | 7/2007 | Zenz | G06F 9/44505 709/226 |
| 2007/0157172 A1* | 7/2007 | Zenz | G06F 9/44505 717/121 |
| 2007/0157185 A1* | 7/2007 | Semerdzhiev | G06F 9/455 717/148 |
| 2007/0162892 A1* | 7/2007 | Zenz | G06F 9/44505 717/121 |
| 2008/0301175 A1* | 12/2008 | Applebaum | G06F 16/24565 |
| 2010/0064009 A1* | 3/2010 | Chen | H04L 67/1002 709/205 |
| 2010/0293409 A1* | 11/2010 | Machida | G06F 11/2038 714/4.1 |
| 2011/0173303 A1* | 7/2011 | Rider | G06F 9/44505 709/220 |
| 2011/0320574 A1* | 12/2011 | Felts | G06F 9/44505 709/220 |
| 2014/0317299 A1* | 10/2014 | Teather | H04L 47/70 709/226 |
| 2015/0081856 A1* | 3/2015 | Rider | H04L 41/0803 709/220 |
| 2015/0264119 A1* | 9/2015 | Shau | H04L 67/10 709/203 |
| 2016/0012609 A1* | 1/2016 | Laska | G06K 9/6267 382/103 |
| 2016/0127206 A1* | 5/2016 | Du | G06F 9/45558 709/224 |
| 2016/0134491 A1* | 5/2016 | Cordray | H04L 41/0816 709/224 |
| 2017/0005865 A1* | 1/2017 | Liu | H04L 41/5054 |
| 2017/0024239 A1* | 1/2017 | Doherty | G06F 11/3051 |
| 2017/0199757 A1* | 7/2017 | Fountain | G06Q 10/067 |
| 2017/0237619 A1* | 8/2017 | Flynn | H04L 41/0816 709/221 |
| 2017/0329645 A1* | 11/2017 | Chen | H04L 41/0806 |
| 2018/0173512 A1* | 6/2018 | Agarwal | H04L 67/1097 |
| 2018/0367389 A1* | 12/2018 | Biazetti | H04L 41/0856 |
| 2020/0192926 A1* | 6/2020 | Arora | G06F 16/345 |

* cited by examiner

A. CONFIGURATION DEFINITION INFORMATION

```
{
  "nodes": [
    {
      "hostname": "node-1",
      "ip": "192.168.0.2"
    },
    {
      "hostname": "node-2",
      "ip": "192.168.0.3"
    }
  ]
}
```

B. TEMPLATE

```
{{#nodes}}
{{ip}} {{hostname}}
{{/nodes}}
```

C. SETTING FILE

```
192.168.0.2 node-1
192.168.0.3 node-2
```

FIG. 6

```
{
  "networks": [
    {
      "type": "heartbeat",
      "interfaces": ["netif-1", "netif-2"]
    },
    {
      "type": "app",
      "interfaces": ["netif-3"]
    }
  ],
  "nodes": [
    {
      "hostname": "host-1",
      "name": "node-1",
      "cip": "192.168.1.1"
    },
    {
      "hostname": "host-2",
      "name": "node-2",
      "cip": "192.168.1.2"
    }
  ]
}
```

EXAMPLE #1: EXAMPLE IN WHICH CLUSTER NODE NAME OF ALL CLUSTER NODES IS EMBEDDED INTO PLACE HOLDER

```
{{#nodes}}
{{name}}
{{name}}RMS:netmask:255.255.255.0
{{/nodes}}
```

EXAMPLE #2: EXAMPLE IN WHICH cip AND CLUSTER NODE NAME OF ALL CLUSTER NODES ARE EMBEDDED INTO PLACE HOLDER

```
{{#nodes}}
{{cip}} {{name}}RMS
{{/nodes}}
```

RENDERING BASED ON LEFT CONFIGURATION DEFINITION INFORMATION

```
node-1 node-
1RMS:netmask:255.255.255.0
node-2 node-2RMS
netmask:255.255.255.0
```

```
192.168.1.1 node-1RMS
192.168.1.2 node-2RMS
```

INFORMATION PROCESSING SYSTEM, CLUSTER SYSTEM CONSTRUCTION METHOD, AND NON-TRANSITORY COMPUTER-READABLE STORAGE MEDIUM FOR STORING CLUSTER CONSTRUCTION PROGRAM

CROSS-REFERENCE TO RELATED APPLICATION

This application is based upon and claims the benefit of priority of the prior Japanese Patent Application No. 2017-197101, filed on Oct. 10, 2017, the entire contents of which are incorporated herein by reference.

FIELD

The embodiment discussed herein relates to a construction method of a cluster system.

BACKGROUND

In the case where a plurality of information processing apparatus are used to construct a cluster system, as depicted in FIG. 13, a user logs in to each cluster node 93 from a management apparatus 92, which manages cluster construction, and performs execution of commands and creation of a setting file. Here, the user is a constructor of a cluster system. Further, in FIG. 13, the cluster nodes 93 represented as cluster node X and cluster node Y are information processing apparatus included in the cluster system to be constructed.

By execution of commands and creation of a setting file, setting of interfaces for a vital monitoring network, setting of behaviors upon occurrence of a split brain, setting of volumes to be taken over between cluster nodes, setting of a network to be taken over between cluster nodes and so forth are performed.

It is to be noted that a technology is available in which a centralized management server installed under a cloud environment creates an installer including a redundant program and setting information and a computer downloads the installer from the centralized management server to install the redundant program and set the setting information. According to this technology, a cluster system may be constructed simply.

Further, a technology is available in which calculation for constructing a system requested in a construction catalog is performed by rearranging resources configuring a server by referring to state information and failure information of the resources and incorporation of hardware for constructing the system including wiring is performed. According to this technology, the availability of an information processing center in which shared resources are deployed may be improved.

Furthermore, a technology is available in which arrangement of virtual servers with respect to physical servers that satisfy inputted availability requirements is determined by referring to system configuration information of a computer system and restriction information for restricting the number of virtual servers that are operable in a physical server of the computer system. According to this technology, redundancy of a computer system may be implemented using a virtual machine technology.

Examples of the related art include, for example, Japanese Laid-open Patent Publication No. 2016-122421, Japanese Laid-open Patent Publication No. 2012-173751, and International Publication Pamphlet No. WO 2009/081736.

SUMMARY

According to an aspect of the embodiments, an information processing system includes a management apparatus that manages construction of a cluster system including a plurality of information processing apparatuses, the management apparatus being configured to acquire information relating to a configuration of the cluster system, and generate definition information that defines the configuration of the cluster system on the basis of the acquired information, and the plurality of information processing apparatuses each including a memory configured to store templates and association information, each of the templates being a model of a construction program to be used for construction of the cluster system, each of the templates including information that designates an extraction method of information from the definition information, and a processor configured to acquire the definition information, perform generation of the construction program in accordance with the definition information, the plurality of templates, and the association information, and execute the generated construction program.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 depicts an example of a setting file template and rendering;

DESCRIPTION OF EMBODIMENTS

Figure 13:
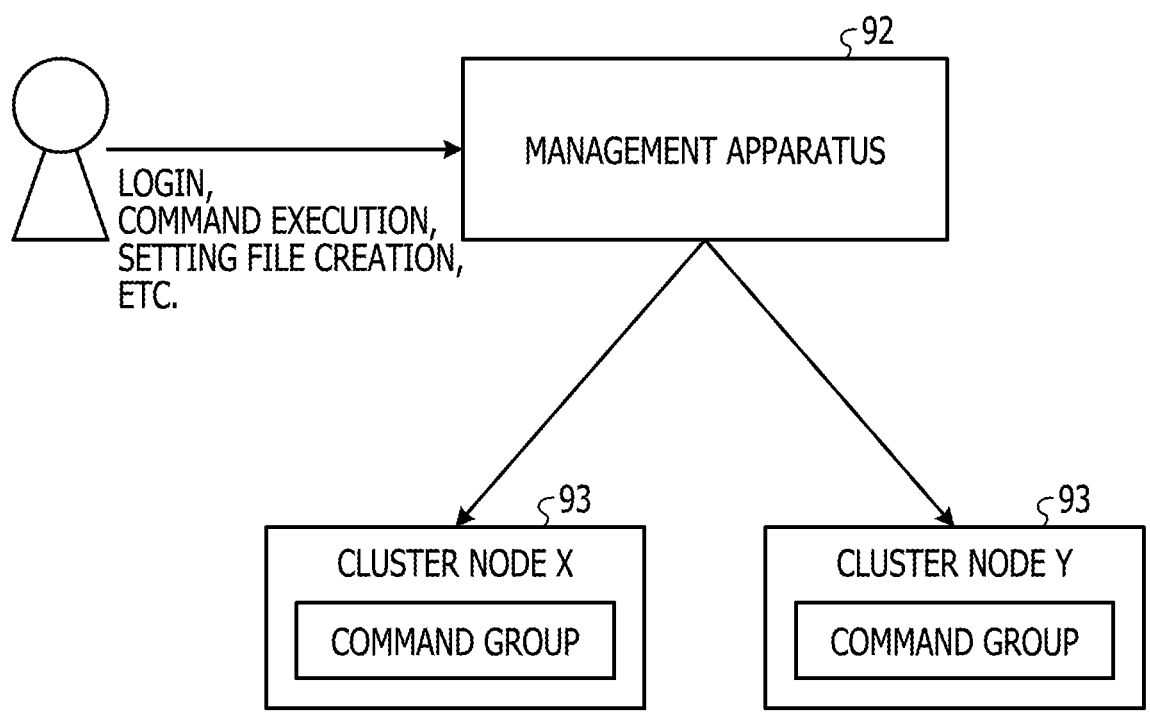
FIG. 13 illustrates a cluster system construction in the past.

According to the technology in the past, for example, the cluster construction depicted in FIG. 13 has a problem in that the phasing number exceeds 100 and it is difficult to construct a cluster system simply. Here, the phasing number is the number of file editing, command execution and so forth performed for cluster construction by the user.

In the following, embodiments of an information processing system and an information processing apparatus disclosed herein are described in detail. It is to be noted that the embodiments do not restrict the technology disclosed herein.

Embodiment 1

Figure 1:
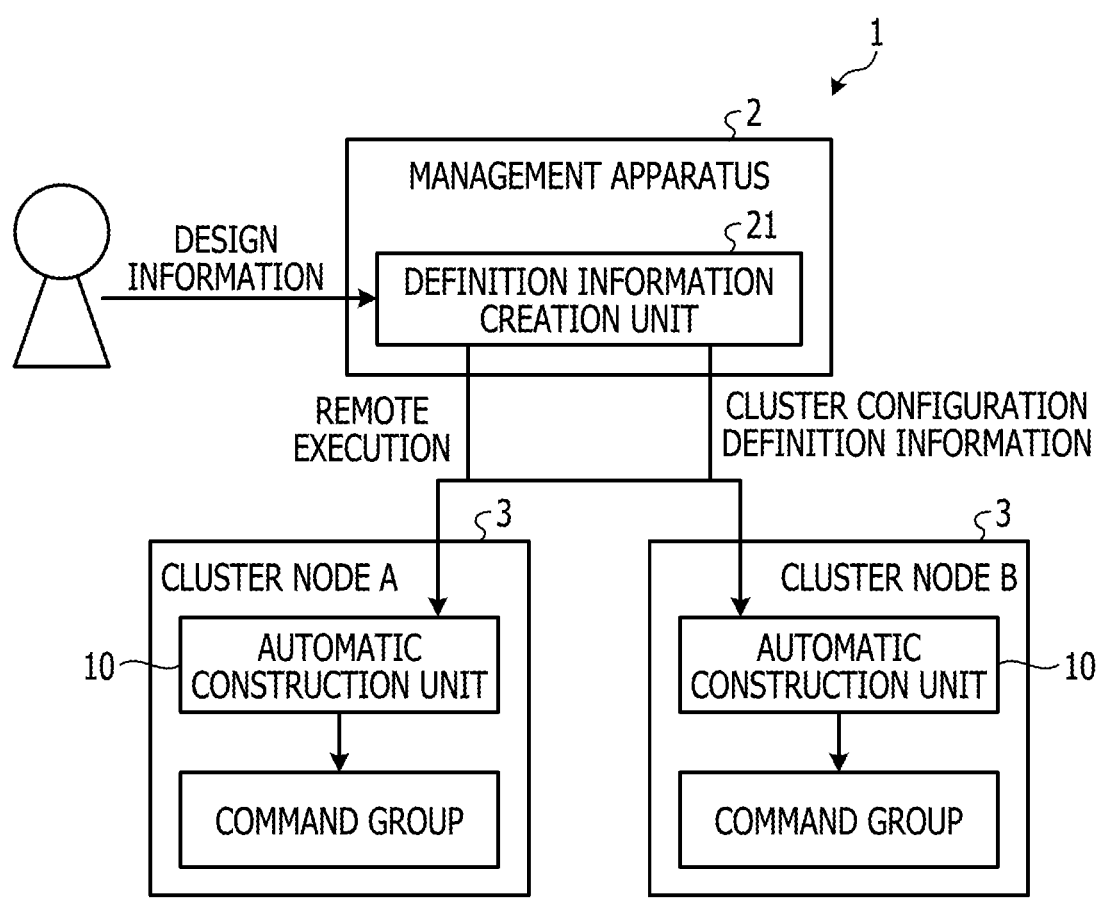
FIG. 1 depicts a configuration of an information processing system according to an embodiment 1.

First, a configuration of an information processing system according to an embodiment 1 is described. FIG. 1 is a view depicting a configuration of the information processing system according to the embodiment 1. As depicted in FIG. 1, the information processing system 1 according to the embodiment 1 includes a management apparatus 2, and cluster nodes 3 represented as cluster node A and cluster node B. It is to be noted that the number of cluster nodes 3 may be equal to or greater than 3.

The management apparatus 2 is an apparatus that manages construction of a cluster system. The cluster nodes 3 are information processing apparatus to be included in the cluster system to be constructed.

The management apparatus 2 includes a definition information creation unit 21. The definition information creation unit 21 accepts design information inputted for a cluster system by a user using a keyboard, a mouse or the like to create cluster configuration definition information. The design information inputted for a cluster system by the user includes a name of the cluster system, names of the cluster nodes 3, a port number of interconnect between the cluster nodes 3, an operation form and so forth.

Figure 2:
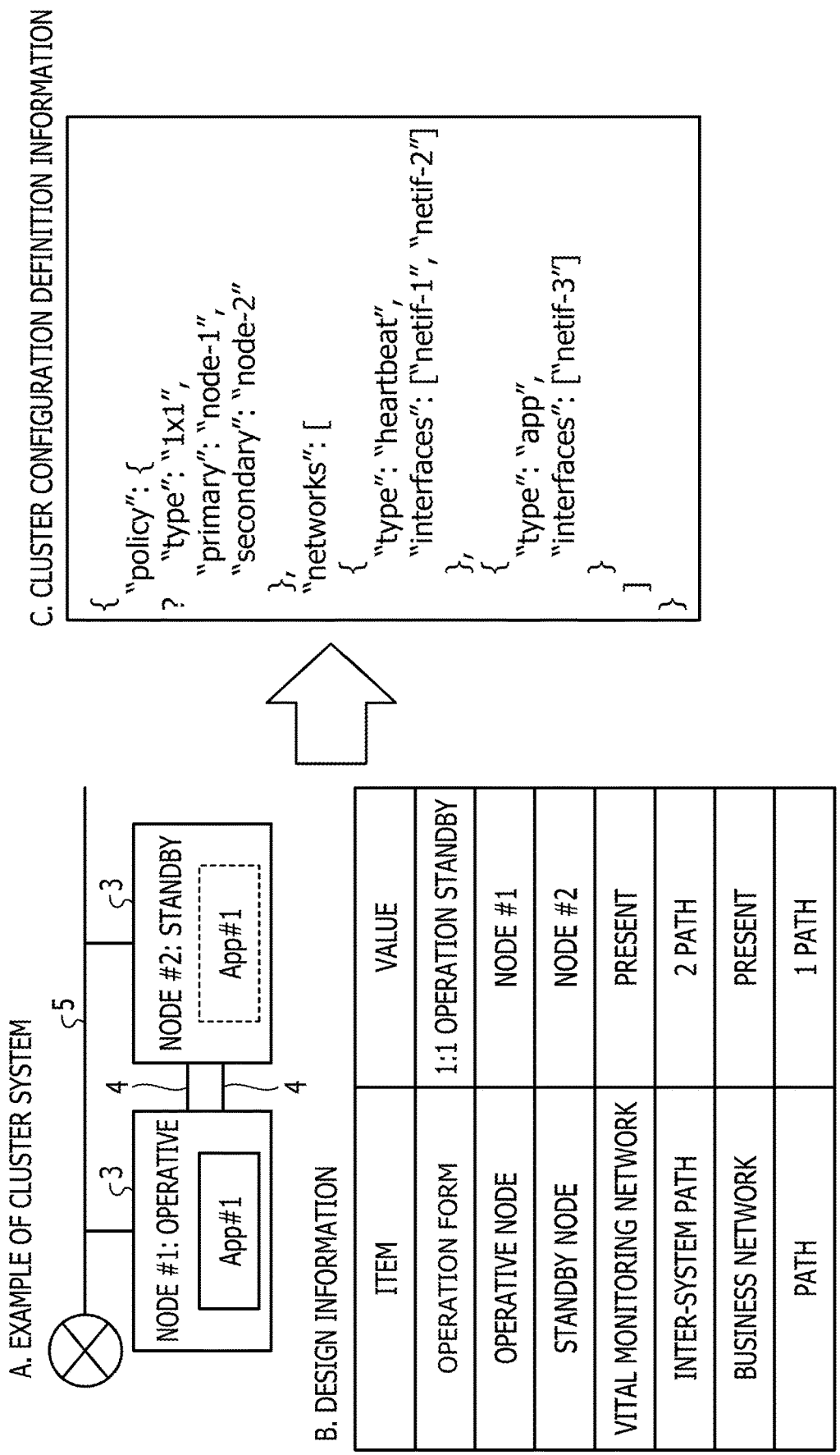
FIG. 2 depicts an example of cluster configuration definition information.

The cluster configuration definition information is information that defines a configuration of a cluster system and so forth. FIG. 2 is a view depicting an example of the cluster configuration definition information. A in FIG. 2 depicts an example of a cluster system; B in FIG. 2 depicts design information of the cluster system; and C in FIG. 2 depicts cluster configuration definition information.

As A depicted in FIG. 2, the cluster system includes cluster nodes 3 represented as node #1 and node #2. The node #1 is an operative node, and the node #2 is a standby node. Each cluster node 3 executes an application represented by App #1. The node #1 and the node #2 are coupled to each other by a vital monitoring network 4 of two paths. The node #1 and the node #2 are coupled to a business network 5 of one path.

Further, as B depicted in FIG. 2, information relating to an operation form and the cluster nodes 3, vital monitoring network 4, business network 5 and so forth is inputted as design information to the management apparatus 2. The management apparatus 2 creates cluster configuration definition information based on the design information.

Referring to C in FIG. 2, "policy":{ . . . } is information that defines an operation form, and "type": "1×1" defines that the operation form is 1:1 operation standby. "primary": "node-1" defines that the operative node is the node #1, and "secondary": "node-2" defines that the standby node is the node #2

"networks": [ . . . ] defines a network, and "type": "hearbeat" defines the vital monitoring network 4. "interfaces" [ . . . ] defines an interface. "type": "app" defines the business network 5.

Each cluster node 3 includes an automatic construction unit 10. The automatic construction unit 10 receives cluster configuration definition information from the management apparatus 2 and executes a command to construct a cluster system. The management apparatus 2 transmits the cluster configuration definition information to the cluster nodes 3 and remotely controls the automatic construction unit 10 of each cluster node 3.

Figure 3:
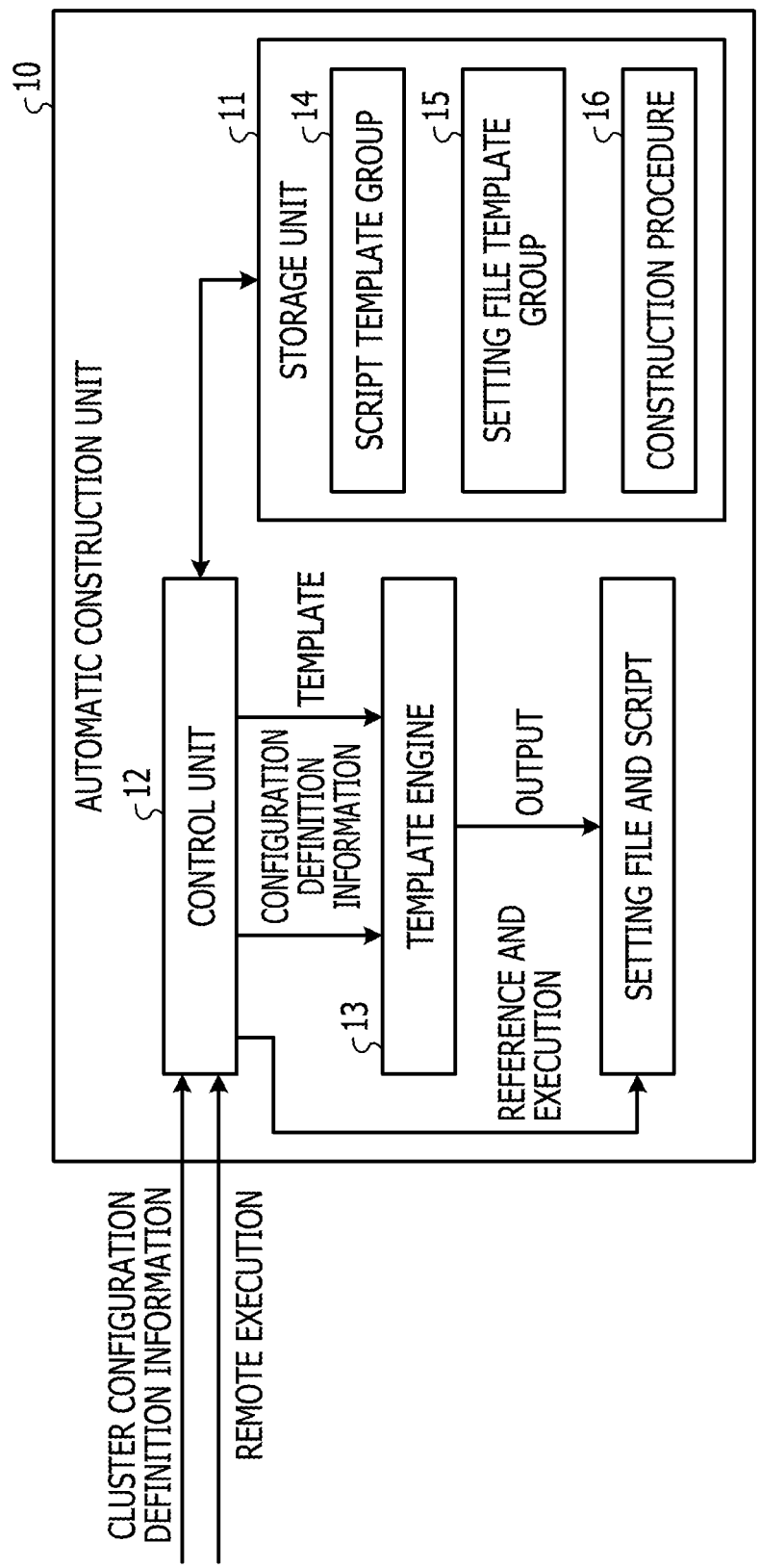
FIG. 3 depicts a functional configuration of an automatic construction unit.

FIG. 3 is a view depicting a functional configuration of the automatic construction unit 10. Referring to FIG. 3, the automatic construction unit 10 includes a storage unit 11, a control unit 12 and a template engine 13.

The storage unit 11 stores information that is used for construction of a cluster system. The storage unit 11 stores a script template group 14, a setting file template group 15 and a construction procedure 16.

The script template group 14 is a group of script templates. A script template is a model that is used to create a script that is used for construction of a cluster system. The script template includes information that designates an extraction method of information from cluster configuration definition information. A script is a program in which commands used for construction of a cluster system are lined up.

The setting file template group 15 is a group of setting file templates. A setting file template is a model that is used to create a setting file that is used for construction of a cluster system. The setting file template includes information that designates an extraction method of information from cluster configuration definition information.

The construction procedure 16 is information that associates a procedure included in a series of procedures, which are performed in order to construct a cluster system, and a template. Here, the template is a script template or a setting file template.

The control unit 12 creates a construction procedure 16 based on cluster configuration definition information and stores the construction procedure 16 into the storage unit 11. Then, the control unit 12 reads in one template corresponding to a procedure in order from the top of the construction procedure 16. Then, the control unit 12 extracts portions relating to the read in template from the cluster configuration definition information and determines the extracted portions as configuration definition information. Then, the control unit 12 passes over the template and the configuration definition information to the template engine 13.

The template engine 13 extracts information from the configuration definition information based on the template to create a setting file or a script. The control unit 12 executes the script created by the template engine 13. Then, the control unit 12 processes a next procedure similarly until no procedure remains in the construction procedure 16 anymore.

Figure 4:
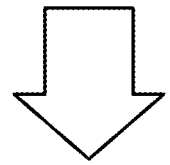
FIG. 4 illustrates creation of a setting file by a template engine.

FIG. 4 is a view illustrating creation of a setting file by the template engine 13. A in FIG. 4 depicts configuration definition information; B in FIG. 4 depicts a template; and C in FIG. 4 depicts a created setting file.

Referring to B in FIG. 4, {{#nodes}} in the first line and {{/nodes}} in the third line designate looping of an array having a key of a name 'nodes' of the configuration definition information by a number of times of the factors. {{ip}} {{hostname}} designates to line up, in regard to an object that is a factor of 'nodes,' a value having a key 'ip' and a value having a key 'hostname' in a space-separated relationship.

As A depicted in FIG. 4, since an array having a key of the name 'nodes' includes two factors, to line up a value having the key 'ip' and a value having the key 'hostname' in a space-separated relationship is performed twice.

In the first time lining up, as a value of the key 'ip,' '192.168.0.2' is extracted from the configuration definition information, and as a value of the key 'hostname,' 'node-1' is extracted from the configuration definition information. Then, '192.168.0.2' and 'node-1' are lined up in a space-separated relationship as C depicted in FIG. 4.

Similarly, in the second time lining up, as a value of the key 'ip,' '192.168.0.3' is extracted from the configuration definition information, and as a value of the key 'hostname,' 'node-2' is extracted from the configuration definition information. Then, '192.168.0.3' and 'node-2' are lined up in a space-separated relationship as C depicted in FIG. 4.

Figure 5:
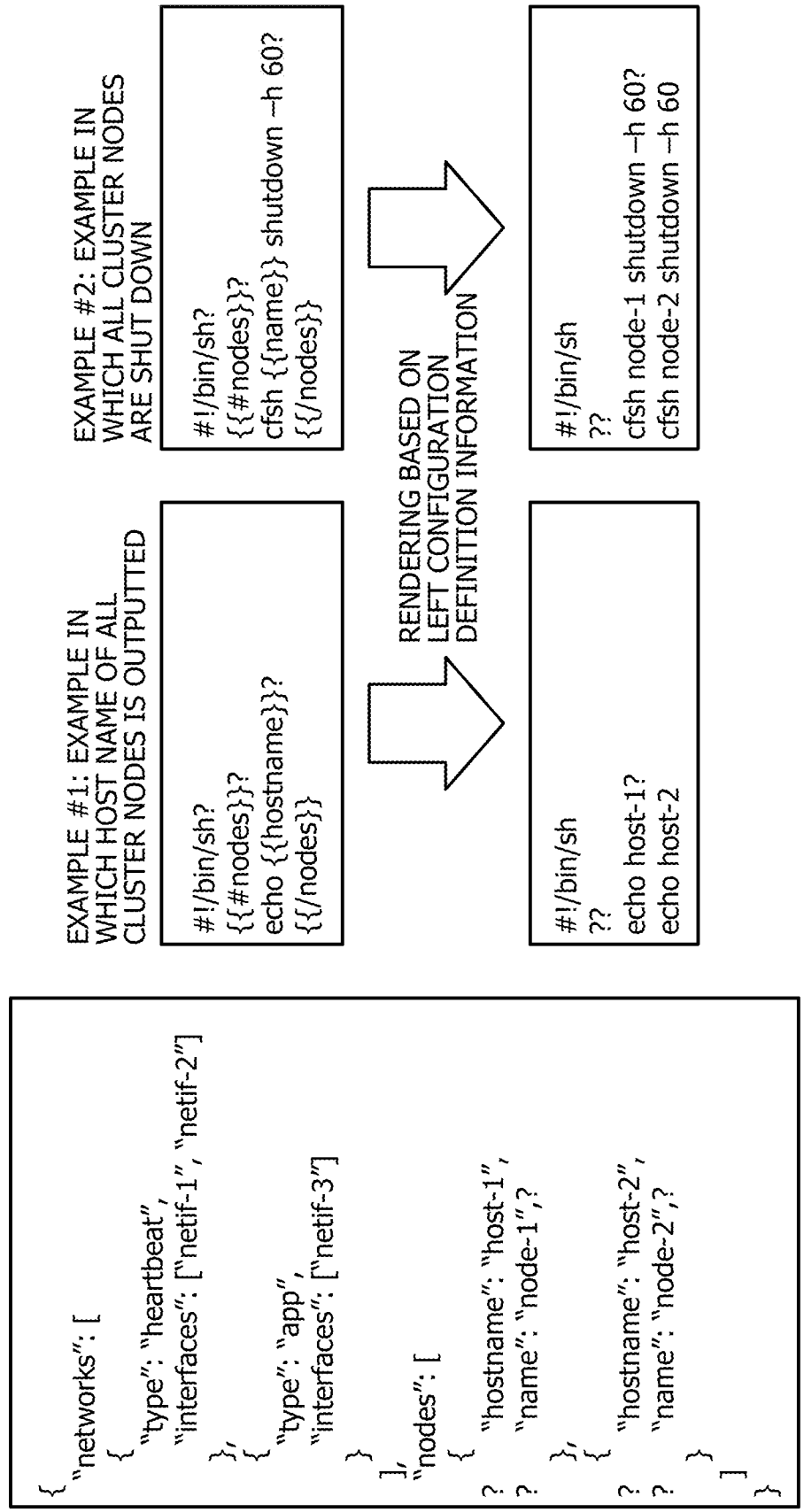
FIG. 5 depicts an example of a script template and rendering.

FIG. 5 is a view depicting an example of a script template and rendering. Here, the rendering is to extract information from configuration definition information based on a template to create a setting file or a script.

In the example #1 in FIG. 5, a script for outputting a host name of all cluster nodes 3 is created. '#!/bin/sh' is an interpreter for executing a command. 'host-1' and 'host-2' are extracted from the configuration definition information and are individually lined up with 'echo' in a space-separated relationship. 'echo host-1' is a command for outputting 'host-1.'

In the example #2 in FIG. 5, a script for shutting down all cluster nodes 3. 'node-1' and 'node-2' are extracted from the configuration definition information and are individually lined up with 'cfsh' in a space-separated relationship. After that, 'shutdown-h 60' is lined up in a space-separated relationship. 'cfsh node-1 shutdown-h 60' is a command for shutting down 'node-1.'

FIG. 6 is a view depicting an example of a setting file template and rendering. In the example #1 in FIG. 6, the template engine 13 embeds a cluster node name of all cluster nodes 3 into a place holder to create a setting file. Here, the place holder is {{key}} and is, in the example #1, {{name}}. From the configuration definition information, 'node-1' and 'node-2' are extracted and two of each of them are lined up in a space-separated relationship, and after that,'RMS:netmask:255.255.255.0' is lined up.

In the example #2 of FIG. 6, the template engine 13 embeds cip and a cluster node name of all cluster nodes 3 into a place holder to create a setting file. From the configuration definition information, '192.168.1.1,' 'node-1' and '192.168.1.2,' 'node-2' are extracted and are lined up in a space-separated relationship, and after that, 'RMS' is lined up.

Figure 7:
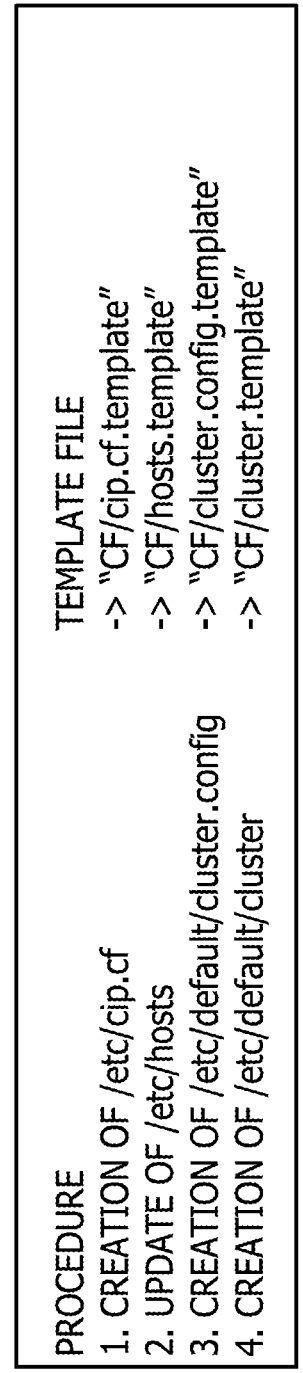
FIG. 7 depicts an example of a construction procedure.

FIG. 7 is a view depicting an example of the construction procedure 16. In FIG. 7, names of template files that store templates are individually associated with four procedures. For example, with the first procedure 'creation of /etc/cip.cf,' "CF/cip.cf.template" is associated.

Figure 8:
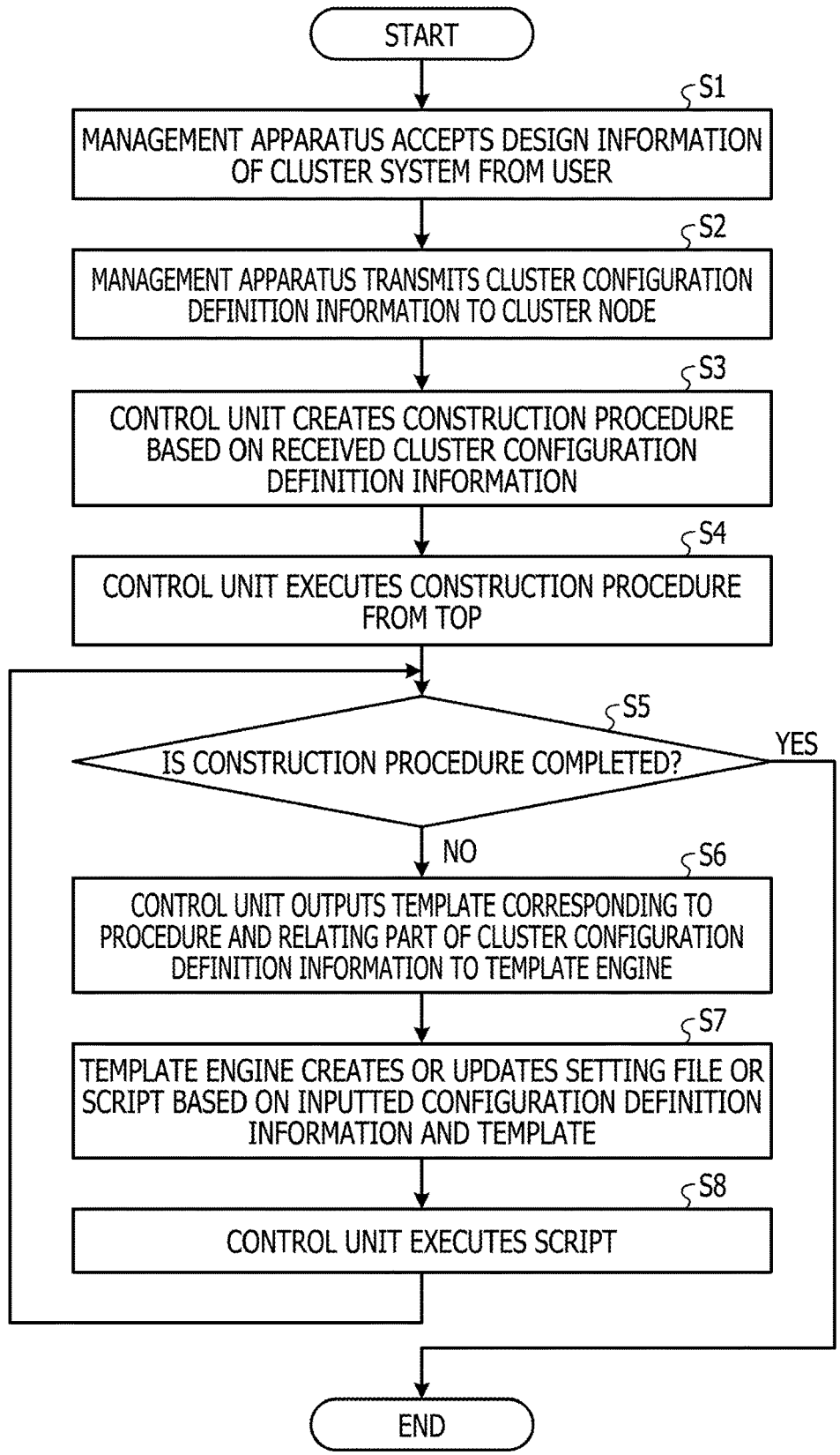
FIG. 8 depicts a flow of processing by the information processing system.

Now, a flow of processing by the information processing system 1 is described. FIG. 8 is a flow chart depicting the flow of processing by the information processing system 1. As depicted in FIG. 8, the management apparatus 2 accepts design information of a cluster system from a user (step S1). Then, the management apparatus 2 transmits cluster configuration definition information to the cluster nodes 3 (step S2).

Then, the control unit 12 of the cluster nodes 3 creates a construction procedure 16 based on the received cluster configuration definition information (step S3). Then, the control unit 12 executes the construction procedure 16 from the top (step S4). The control unit 12 decides whether or not the construction procedure 16 is completed (step S5), and in the case where the construction procedure 16 is completed, the processing is ended.

On the other hand, in the case where the construction procedure 16 is not completed, the control unit 12 outputs a template corresponding to the procedure and associated part of the cluster configuration definition information (configuration definition information) to the template engine 13 (step S6). Then, the template engine 13 creates or updates a setting file or a script based on the configuration definition information and the template inputted thereto (step S7). Then, the control unit 12 executes the script (step S8) and returns the processing to step S5.

As described above, in the embodiment 1, the definition information creation unit 21 of the management apparatus 2 receives design information from the user to create cluster configuration definition information and transmits the cluster configuration definition information to the cluster nodes 3 to activate the automatic construction unit 10. Then, the automatic construction unit 10 stores the template group and the construction procedure 16, creates a setting file and a script based on the cluster configuration definition information, template group and construction procedure 16, and executes the script. Accordingly, the user may construct a cluster system simply.

Further, in the embodiment 1, the control unit 12 of the automatic construction unit 10 passes over, based on the construction procedure 16, the template corresponding to the procedure and the configuration definition information to the template engine 13. Then, the template engine 13 creates a setting file or a script based on the template and the configuration definition information. Then, the control unit 12 executes the script. Accordingly, the automatic construction unit 10 may implement cluster automatic construction by the control unit 12 and the template engine 13.

Further, in the embodiment 1, the templates include script templates and file templates. Accordingly, the template engine 13 may create a script using a script template and create a setting file using a setting file template.

Furthermore, in the embodiment 1, the cluster configuration definition information includes, regarding a cluster system, information of an operation form, information of the vital monitoring network 4 and information of the business network 5. Accordingly, the information processing system 1 may construct a cluster system including the operation form, vital monitoring network 4 and business network 5.

Embodiment 2

After construction of a cluster system is performed, the construction management apparatus frequently performs configuration management such as installation of middleware into the cluster nodes 3 and so forth. Accordingly, if also configuration management is performed in collaboration with the configuration management apparatus after construction of a cluster system, the burden on the user may be reduced further. Therefore, in an embodiment 2, an information processing system that collaborates with a configuration management apparatus to automatically perform up to configuration management.

Figure 9B:
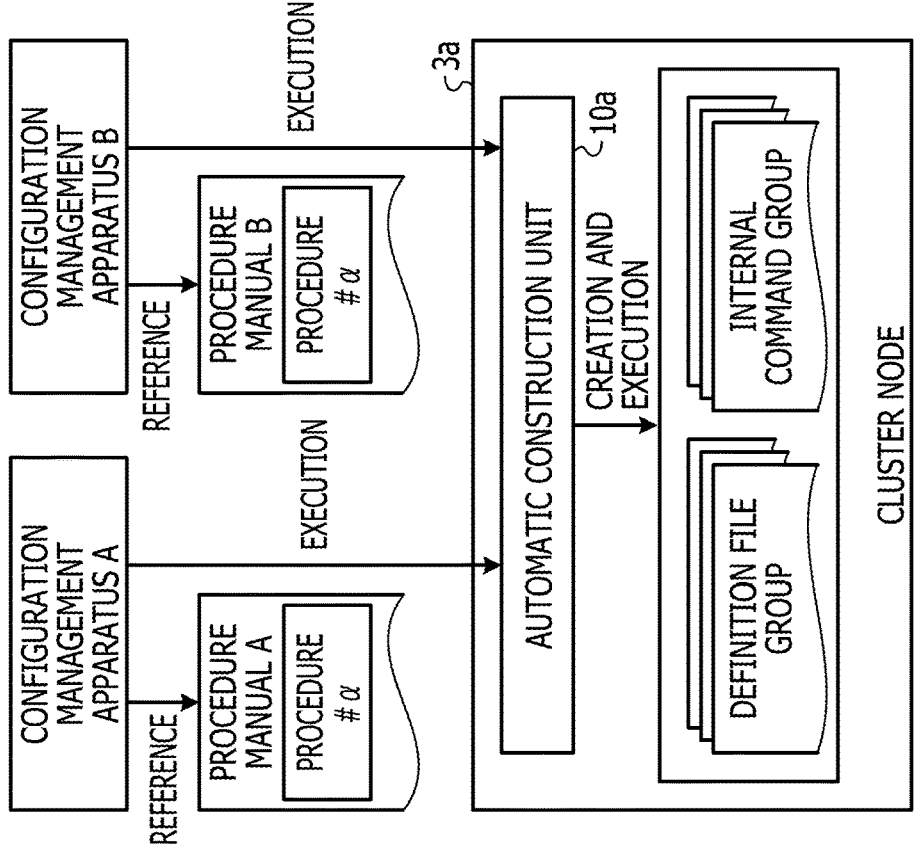
FIGS. 9A and 9B illustrate collaboration with a configuration management apparatus.
Figure 9A:
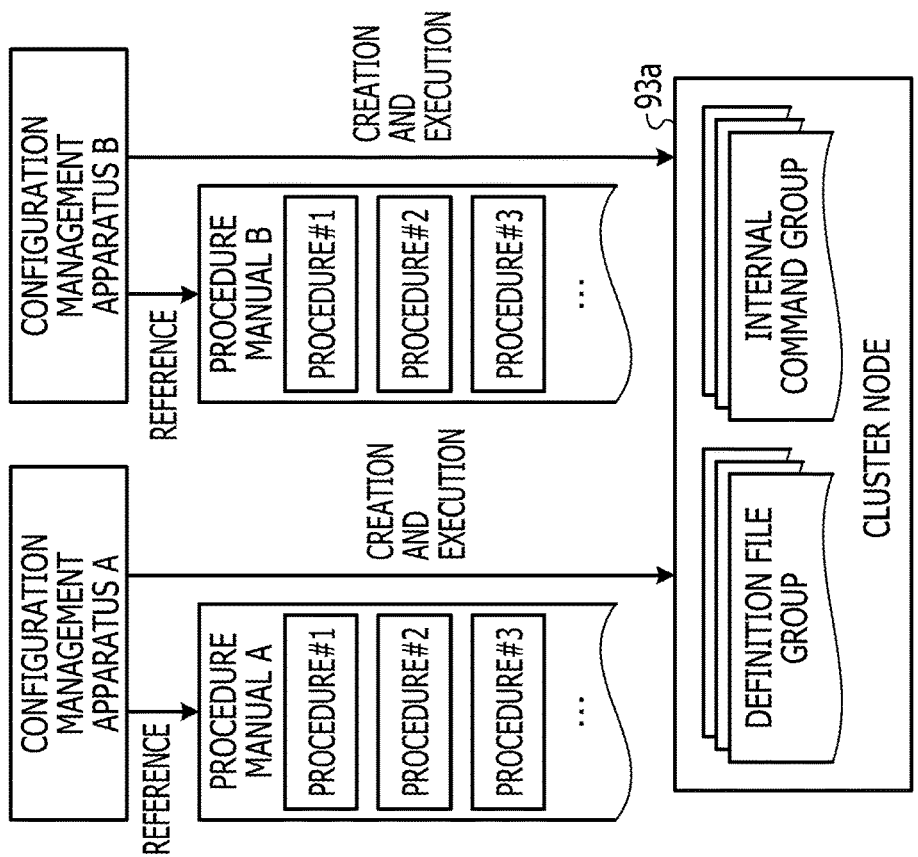

FIGS. 9A and 9B are views illustrating collaboration with a configuration management apparatus. FIG. 9A depicts configuration management by the configuration management apparatus and FIG. 9B depicts configuration management by the information processing system according to the embodiment 2.

As depicted in FIG. 9A, a configuration management apparatus A causes cluster nodes 93a to perform creation of a definition file and execution of an internal command based on procedures (procedure #1, procedure #2, procedure #3, . . . ) defined in a procedure manual A. Similarly, a configuration management apparatus B causes the cluster nodes 93a to perform creation of a definition file and execution of an internal command based on procedures (procedure #1, procedure #2, procedure #3, ... ) defined in another procedure manual B. The procedure manual A and the procedure manual B are different in format where the cluster node A and the cluster node B are different. Accordingly, the user will create both the cluster node A and the cluster node B.

On the other hand, as depicted in FIG. 9B, in the information processing system according to the embodiment 2, only a given procedure a is defined in the procedure manual A and the procedure manual B. The configuration management apparatus A refers to the procedure manual A in which only the procedure a is defined to cause the cluster nodes 3a to execute an automatic construction unit 10a. The automatic construction unit 10a includes therein definitions of a procedure #1, another procedure #2, a further procedure #3, ... of the procedure A. Accordingly, the automatic construction unit 10a executes creation of a definition file and execution of internal commands based on the internal definitions.

Similarly, the configuration management apparatus B refers to the procedure manual B in which only the procedure a is defined to cause the cluster nodes 3a to execute an automatic construction unit 10a. The automatic construction unit 10a includes therein definitions of a procedure #1, another procedure #2, a further procedure #3, ... of the procedure B. Accordingly, the automatic construction unit 10a executes creation of a definition file and execution of an internal command based on the internal definitions.

In this manner, in the information processing system according to the embodiment 2, the user may cause the cluster nodes 3a to collaborate with the configuration management apparatus and may perform configuration management of the cluster nodes 3a simply by definition only of the given procedure a.

Figure 10:
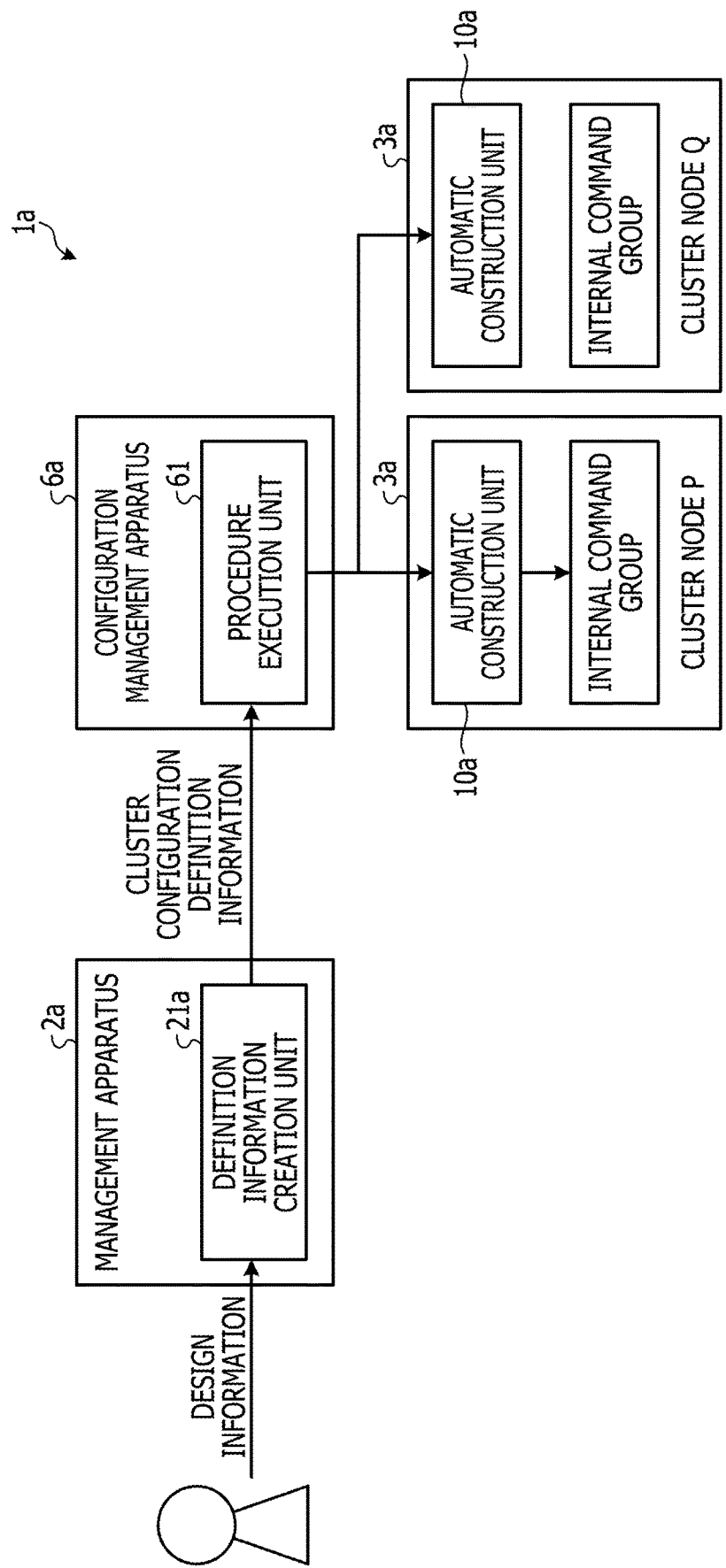
FIG. 10 depicts a configuration of an information processing system according to an embodiment 2.

FIG. 10 is a view depicting a configuration of the information processing system according to the embodiment 2. As depicted in FIG. 10, the information processing system 1a according to the embodiment 2 includes a management apparatus 2a, a configuration management apparatus 6a and cluster nodes 3a represented as cluster node P and cluster node Q. It is to be noted that the number of configuration management apparatus 6a may be 2 or more, and the number of cluster nodes 3 may be 3 or more.

The management apparatus 2a includes a definition information creation unit 21a. The definition information creation unit 21a accepts design information from a user and creates cluster configuration definition information. However, the created cluster configuration definition information is inputted to the configuration management apparatus 6a.

The configuration management apparatus 6a is an apparatus that performs configuration management of the information processing apparatus and includes a procedure execution unit 61. The procedure execution unit 61 refers to a procedure manual and transmits, if only the given procedure a is defined in the procedure manual, the cluster configuration definition information to the cluster nodes 3a to activate the automatic construction unit 10a.

The cluster nodes 3a are information processing apparatus included in a cluster system to be constructed. Each cluster node 3a includes an automatic construction unit 10a. The automatic construction unit 10a performs configuration management by performing, using a template, creation of a definition file and execution of an internal command in addition to construction of a cluster system.

Figure 11:
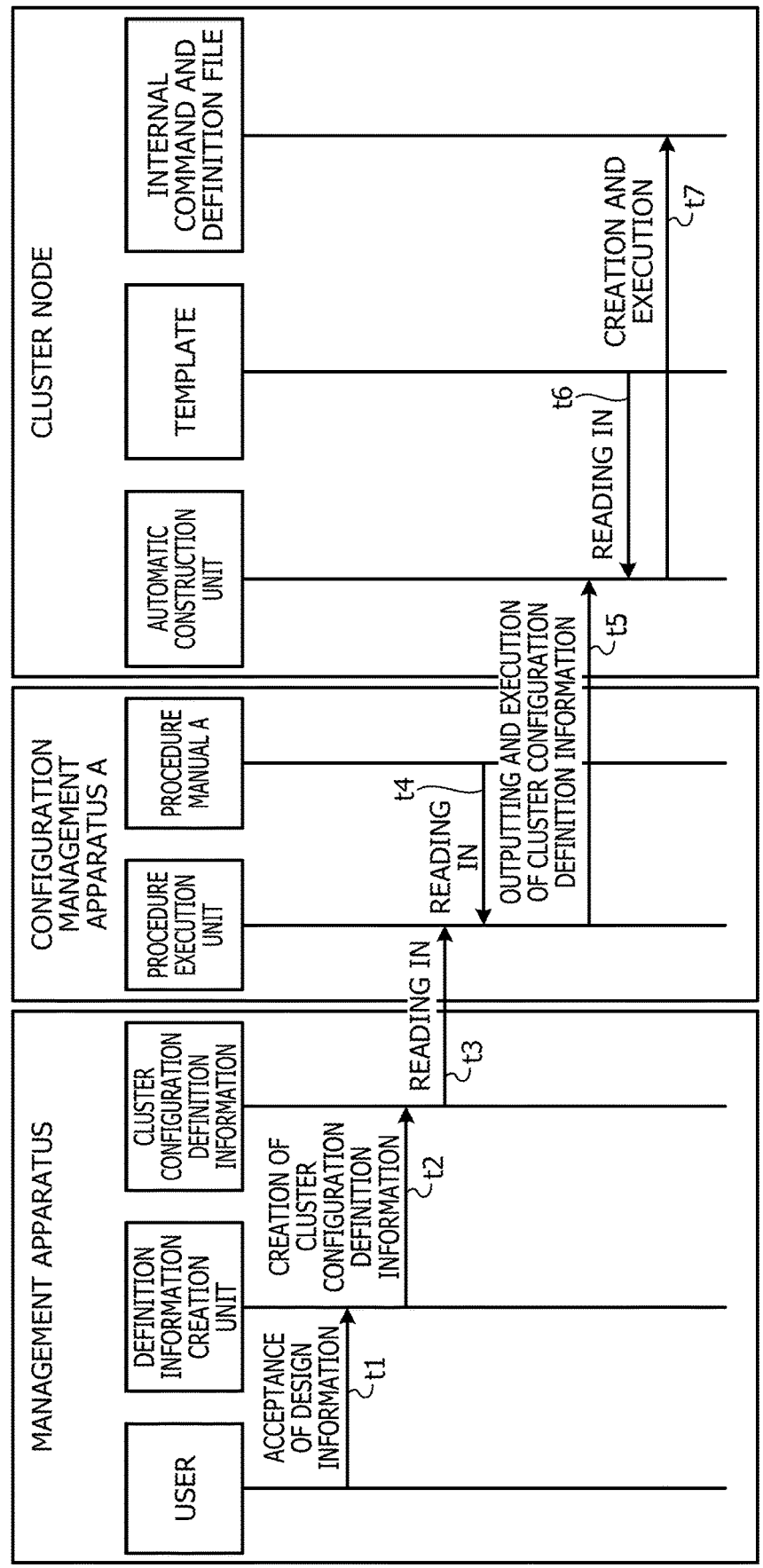
FIG. 11 depicts a flow of processing by the information processing system according to the embodiment 2.

FIG. 11 is a sequence diagram depicting a flow of processing by the information processing system 1a according to the embodiment 2. FIG. 11 depicts the processing in the case where the information processing system 1a collaborates with the configuration management apparatus A. As depicted in FIG. 11, the definition information creation unit 21a of the management apparatus 2a accepts design information inputted by the user (t1) and creates cluster configuration definition information (t2).

Then, the procedure execution unit 61 of the configuration management apparatus A reads in the cluster configuration definition information (t3) and reads in the procedure manual A (t4). Then, the configuration management apparatus A transmits the cluster configuration definition information to the cluster nodes 3a and executes the automatic construction unit 10a (t5).

Then, the automatic construction unit 10a reads in the templates (t6), creates a setting file and a script and executes the created script (t7). The creation of a setting file includes creation of a definition file to be used for the configuration management. Further, the script to be created includes a script for executing an internal command for the configuration management.

As described above, in the embodiment 2, if only the given procedure a is defined in the procedure manual, the procedure execution unit 61 of the configuration management apparatus 6a transmits cluster configuration definition information to the cluster nodes 3a such that the cluster nodes 3a execute the automatic construction unit 10a. Then, the automatic construction unit 10a performs cluster construction and configuration management. Accordingly, the user may perform construction and configuration management of a cluster system simply.

It is to be noted that, while the automatic construction units 10 and 10a in the embodiments 1 and 2 are described above, by implementing the configuration the automatic construction units 10 and 10a by software, automatic construction programs having similar functions may be obtained. Thus, a computer that executes the automatic construction program is described.

Figure 12:
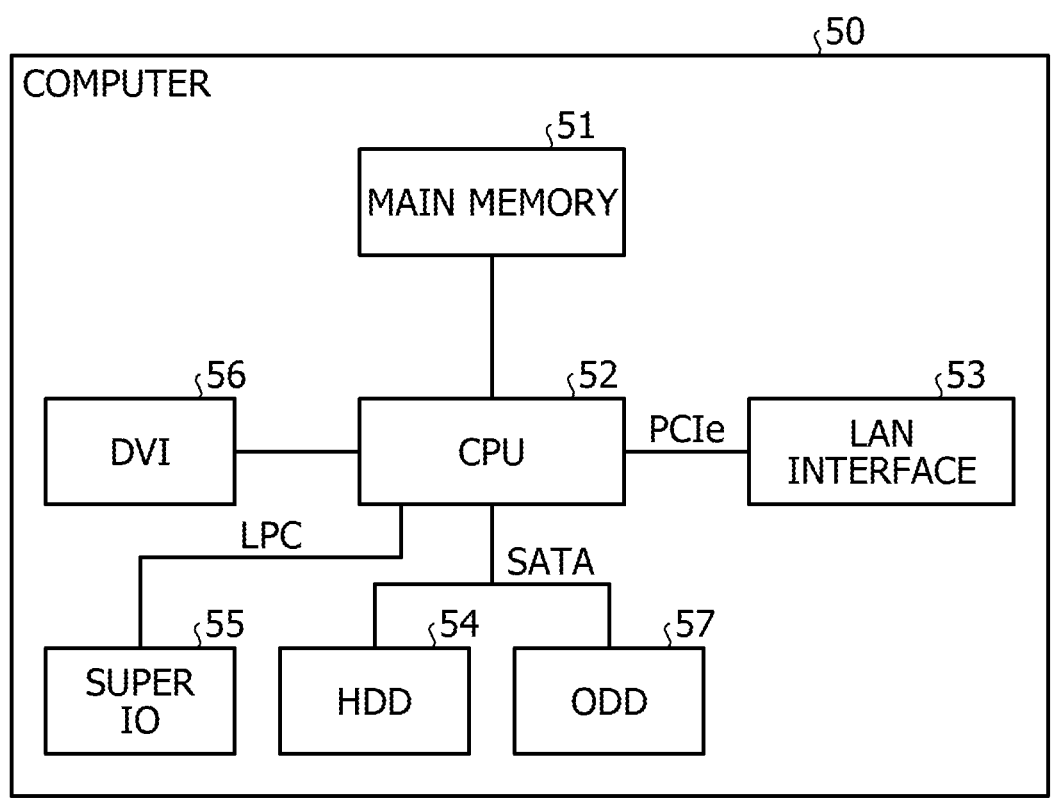
FIG. 12 depicts a hardware configuration of a computer that executes an automatic construction program according to an embodiment.

FIG. 12 is a view depicting a hardware configuration of a computer that executes an automatic construction program according to an embodiment. As depicted in FIG. 12, the computer 50 includes a main memory 51, a central processing unit (CPU) 52, a local area network (LAN) interface 53, and a hard disk drive (HDD) 54. The computer 50 further includes a super input output (IO) 55, a digital visual interface (DVI) 56 and an optical disk drive (ODD) 57.

The main memory 51 is a memory for storing programs, in-progress results and so forth. The CPU 52 is a central processing unit that reads out a program from the main memory 51 and executes the program. The CPU 52 includes a chip set including a memory controller.

The LAN interface 53 is an interface for coupling the computer 50 to a different computer through a LAN. The HDD 54 is a disk apparatus for storing programs and data, and the super IO 55 is an interface for coupling an inputting apparatus such as a mouse or a keyboard. The DVI 56 is an interface for coupling a liquid crystal display apparatus, and the ODD 57 is an apparatus for reading and writing of a digital versatile disc (DVD).

The LAN interface 53 is coupled to the CPU 52 by a peripheral component interconnect express (PCIe), and the HDD 54 and the ODD 57 are coupled to the CPU 52 by a serial advanced technology attachment (SATA). The super IO 55 is coupled to the CPU 52 by a low pin count (LPC).

The automatic construction program that is executed by the computer 50 is stored in a DVD that is an example of a recording medium that is readable by the computer 50 such that it is read out from the DVD by the ODD 57 and installed into the computer 50. Alternatively, the automatic construction program is stored in a database of a different computer system coupled to the LAN interface 53 such that it is read out from the database and installed into the computer 50. Then, the installed automatic construction program is stored into the HDD 54 such that it is read out into the main memory 51 and executed by the CPU 52.

Further, by implementing the configurations the management apparatus 2 and 2a have by software, management programs having similar functions may be obtained. The management program is executed by a computer similar to the computer 50. Further, by implementing the configuration including the configuration management apparatus 6a by software, configuration management programs having similar functions may be obtained. The configuration management programs are executed by a computer similar to the computer 50.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising:
    a management apparatus configured to manage construction of a cluster system, the cluster system including a plurality of cluster nodes; and
    a plurality of information processing apparatuses, each of the plurality of information processing apparatuses being configured to be operable as any of the plurality of cluster nodes,
    the management apparatus includes:
    a memory; and
    a processor coupled to the memory, the processor being configured to:
    acquire, in response to an input from a user, information relating to a configuration of the cluster system;
    generate definition information in accordance with the acquired information, the definition information including a plurality of parameters to be used by each of the plurality of cluster nodes upon performing a construction procedure for the construction of the cluster system, the construction procedure including a plurality of tasks to be executed by each of the plurality of cluster nodes, each of the plurality of parameters included in the definition information being associated with a corresponding task from among the plurality of tasks; and
    transmit the generated definition information to the plurality of information processing apparatuses to cause a respective information processing apparatus to generate a program for the construction procedure based on the transmitted definition information,
    each of the plurality of information processing apparatuses includes:
    a memory configured to store a plurality of script templates and association information, each of the plurality of script templates being a template configured to generate a construction program by using a corresponding parameter from among the plurality of parameters included in the definition information, the construction program being a program for the construction procedure, the association information indicating a plurality of pairs each of which is associated with any one of the plurality of tasks in the construction procedure, each of the plurality of pairs indicating a relation between the corresponding parameter from among the plurality of parameters in the definition information and a corresponding script template from among the plurality of script templates; and
    a processor coupled to the memory and the processor configured to:
    receive the definition information from the management apparatus;
    select, for each of the plurality of tasks in the construction procedure, the corresponding script template from among the plurality of script templates by using a corresponding pair of the plurality of pairs included in the association information, the selected corresponding script template being selected based on the corresponding script template indicated by the corresponding pair associated with the respective task;
    extract, for each of the plurality of tasks in the construction procedure, the corresponding parameter from among the plurality of parameters in the definition information by using the corresponding pair of the plurality of pairs included in the association information, the selected corresponding parameter being selected based on the corresponding parameter indicated by the corresponding pair associated with the respective task;
    generate, for each of the plurality of tasks in the construction procedure, a corresponding construction program by using the selected script template and the extracted parameter; and
    execute, for each of the plurality of tasks in the construction procedure, the generated corresponding construction program to perform the respective task.

2. The information processing system according to claim 1, wherein the generation of the construction program includes
    selecting, from the templates, a first template by using the association information, and
    generating the construction program in accordance with the selected first template and the definition information.

3. The information processing system according to claim 1, wherein
    the memory is configured to store other templates each of which is a model of setting information to be used for setting of the cluster system, each of the other templates including information that designates an extraction method of information from the definition information, and
    the processor is configured to generate the setting information in accordance with the definition information, the other templates, and the association information.

4. The information processing system according to claim 3, wherein the setting information includes a definition file that is used for configuration management of the cluster system.

5. The information processing system according to claim 1, wherein the definition information includes at least one of information of an operation form, information of a vital monitoring network, and information of a business network.

6. A cluster system construction method implemented by a cluster system including a management apparatus and a plurality of information processing apparatuses, the management apparatus being configured to manage construction of a cluster system, each of the plurality of information processing apparatuses being configured to be operable as any of a plurality of cluster nodes in the cluster system, the method comprising:

executing a management process by the management apparatus, the management process including:
in response to an input from a user, acquiring, by the management apparatus, information relating to a configuration of the cluster system;
generating, by the management apparatus, definition information in accordance with the acquired information, the definition information including a plurality of parameters to be used by each of the plurality of cluster nodes upon performing a construction procedure for the construction of the cluster system, the construction procedure including a plurality of tasks to be executed by each of the plurality of cluster nodes, each of the plurality of parameters included in the definition information being associated with a corresponding task from among the plurality of tasks;
transmitting the generated definition information to the plurality of information processing apparatuses to cause a respective information processing apparatus to generate a program for the construction procedure based on the transmitted definition information; and
executing a construction process by each of the plurality of information processing, the construction process including:
receiving the definition information from the management apparatus, each information processing apparatus including a memory configured to store a plurality of script templates and association information, each of the plurality of script templates being a template configured to generate a construction program by using a corresponding parameter from among the plurality of parameters included in the definition information, the construction program being a program for the construction procedure, the association information indicating a plurality of pairs each of which is associated with any one of the plurality of tasks in the construction procedure, each of the plurality of pairs indicating a relation between the corresponding parameter from among the plurality of parameters in the definition information and a corresponding script template from among the plurality of script templates;
selecting, for each of the plurality of tasks in the construction procedure, by each of the plurality of information processing apparatuses, the corresponding script template from among the plurality of script templates by using a corresponding pair of the plurality of pairs included in the association information, the selected corresponding script template being selected based on the corresponding script template indicated by the corresponding pair associated with the respective task;
extracting, for each of the plurality of tasks in the construction procedure, by each of the plurality of information processing apparatuses, the corresponding parameter from among the plurality of parameters in the definition information by using the corresponding pair of the plurality of pairs included in the association information, the selected corresponding parameter being selected based on the corresponding parameter indicated by the corresponding pair associated with the respective task;
generating, for each of the plurality of tasks in the construction procedure, by each of the plurality of information processing apparatuses, a corresponding construction program by using the selected script template and the extracted parameter; and
executing, for each of the plurality of tasks in the construction procedure, by each of the plurality of information processing apparatus, the generated corresponding construction program to perform the respective task.

7. The cluster system construction method according to claim 6, wherein the generating of the construction program includes
selecting, from the templates, a first template by using the association information, and
generating the construction program in accordance with the selected first template and the definition information.

8. The cluster system construction method according to claim 6,
wherein the memory is configured to store other templates each of which is a model of setting information to be used for setting of the cluster system, each of the other templates including information that designates an extraction method of information from the definition information, and
the cluster system construction method further comprising: generating, by the information processing apparatus, the setting information in accordance with the definition information, the other templates, and the association information.

9. The cluster system construction method according to claim 8, wherein the setting information includes a definition file that is used for configuration management of the cluster system.

10. The cluster system construction method according to claim 6, wherein the definition information includes at least one of information of an operation form, information of a vital monitoring network, and information of a business network.

11. A non-transitory computer-readable medium storing a cluster system construction program that causes an information processing apparatus to execute a process, the information processing apparatus being operable as any of a plurality of cluster nodes in a cluster system, the information processing apparatus being configured to communicate with a management apparatus in the cluster system, the management apparatus being configured to: acquire, in response to an input from a user, information relating to a configuration of the cluster system; generate definition information in accordance with the acquired information, the definition information including a plurality of parameters to be used by each of the plurality of cluster nodes upon performing a construction procedure for the construction of the cluster system, the construction procedure including a plurality of tasks to be executed by each of the plurality of cluster nodes, each of the plurality of parameters included in the definition information being associated with a corresponding task from among the plurality of tasks; and transmit the generated definition information to the information processing apparatus to cause the information processing apparatus to generate a program for the construction procedure based on the transmitted definition information, the process comprising:

receiving the definition information from the management apparatus, the information processing apparatus including a memory configured to store a plurality of script templates and association information, each of the plurality of script templates being a template configured to generate a construction program by using a corresponding parameter from among the plurality of parameters included in the definition information, the construction program being a program for the construction procedure, the association information indicating a plurality of pairs each of which is associated with any one of the plurality of tasks in the construction procedure, each of the plurality of pairs indicating a relation between the corresponding parameter from among the plurality of parameters in the definition information and a corresponding script template from among the plurality of script templates;

selecting, for each of the plurality of tasks in the construction procedure, the corresponding script template from among the plurality of script templates by using a corresponding pair of the plurality of pairs included in the association information, the selected corresponding script template being selected based on the corresponding script template indicated by the corresponding pair associated with the respective task;

extracting, for each of the plurality of tasks in the construction procedure, the corresponding parameter from among the plurality of parameters in the definition information by using the corresponding pair of the plurality of pairs included in the association information, the selected corresponding parameter being selected based on the corresponding parameter indicated by the corresponding pair associated with the respective task;

generating, for each of the plurality of tasks in the construction procedure, a corresponding construction program by using the selected script template and the extracted parameter; and executing, for each of the plurality of tasks in the construction procedure, the generated corresponding construction program to perform the respective task.

* * * * *